United States Patent
Haje

(10) Patent No.: US 9,598,965 B2
(45) Date of Patent: Mar. 21, 2017

(54) BLADE FOR A THERMAL TURBOMACHINE

(75) Inventor: Detlef Haje, Gorlitz (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 643 days.

(21) Appl. No.: 14/126,438

(22) PCT Filed: Jun. 13, 2012

(86) PCT No.: PCT/EP2012/061210
§ 371 (c)(1),
(2), (4) Date: Dec. 15, 2013

(87) PCT Pub. No.: WO2012/175387
PCT Pub. Date: Dec. 27, 2012

(65) Prior Publication Data
US 2014/0112797 A1    Apr. 24, 2014

(30) Foreign Application Priority Data
Jun. 20, 2011 (DE) .......... 10 2011 077 804

(51) Int. Cl.
*F01D 5/14* (2006.01)
*F01D 5/28* (2006.01)

(52) U.S. Cl.
CPC ............. *F01D 5/282* (2013.01); *F01D 5/147* (2013.01); *F01D 5/28* (2013.01); *Y02T 50/672* (2013.01); *Y10T 29/49337* (2015.01)

(58) Field of Classification Search
CPC . F01D 5/147; F01D 5/28; F01D 5/282; Y02T 50/672; Y10T 29/49337
See application file for complete search history.

(56) References Cited

U.S. PATENT DOCUMENTS

| | | | |
|---|---|---|---|
| 4,929,154 A | 5/1990 | Wildner | |
| 7,510,778 B2 | 3/2009 | Bernard et al. | |
| 2002/0127111 A1 | 9/2002 | Kaneko | |
| 2003/0129061 A1 | 7/2003 | Dindar | |
| 2004/0261978 A1* | 12/2004 | Zhan | B82Y 30/00 165/104.11 |
| 2006/0275626 A1 | 12/2006 | Bernard | |
| 2008/0314568 A1* | 12/2008 | Zhan | B82Y 30/00 165/135 |
| 2009/0047502 A1* | 2/2009 | Folaron | B32B 5/26 428/327 |

(Continued)

FOREIGN PATENT DOCUMENTS

DE     3802774 A1    8/1989
DE  102008061573 A1    8/2010
(Continued)

*Primary Examiner* — Igor Kershteyn
(74) *Attorney, Agent, or Firm* — Beusse Wolter Sanks & Maire

(57) ABSTRACT

A blade for a thermal turbomachine is provided. The blade has a blade airfoil having a first extent in a substantially radial orientation in relation to a rotational axis of the turbomachine and a second extent which is configured transversely with respect to the first extent, and comprising a blade root which adjoins the rotor blade and rounds off the rotor blade in the first extent. The blade has graphene at least in regions. A method for producing a blade of this type is also provided.

15 Claims, 5 Drawing Sheets

(56) References Cited

U.S. PATENT DOCUMENTS

| | | | |
|---|---|---|---|
| 2009/0176112 A1 | 7/2009 | Hill | |
| 2010/0035093 A1* | 2/2010 | Ruoff | H01G 11/36 |
| | | | 429/493 |
| 2011/0020134 A1* | 1/2011 | Jensen | B82Y 30/00 |
| | | | 416/241 R |
| 2012/0028055 A1* | 2/2012 | Schmidt | F01D 5/288 |
| | | | 428/450 |

FOREIGN PATENT DOCUMENTS

| | | | |
|---|---|---|---|
| DE | EP 2584067 A1 * | 4/2013 | ............ C23C 30/00 |
| EP | 1719699 A1 | 11/2006 | |
| FR | 2371990 A1 | 6/1978 | |
| FR | 2946663 A1 | 12/2010 | |
| GB | 718382 A | 11/1954 | |
| JP | H01216002 A | 8/1989 | |
| JP | 2002266603 A | 9/2002 | |
| JP | 2003120205 A | 4/2003 | |
| JP | 2004285864 A | 10/2004 | |
| JP | 2006300057 A | 11/2006 | |
| JP | 2010144211 A | 7/2010 | |

* cited by examiner

FIG 1
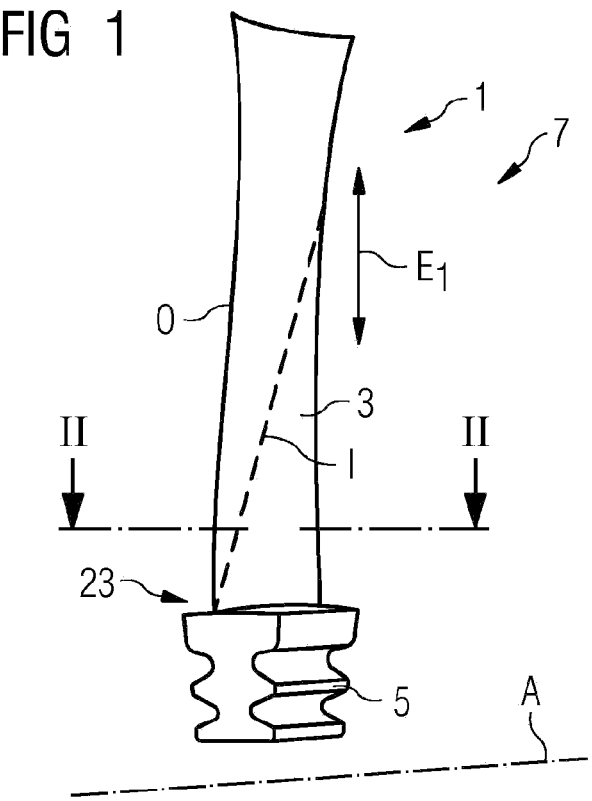
FIG 2  II-II
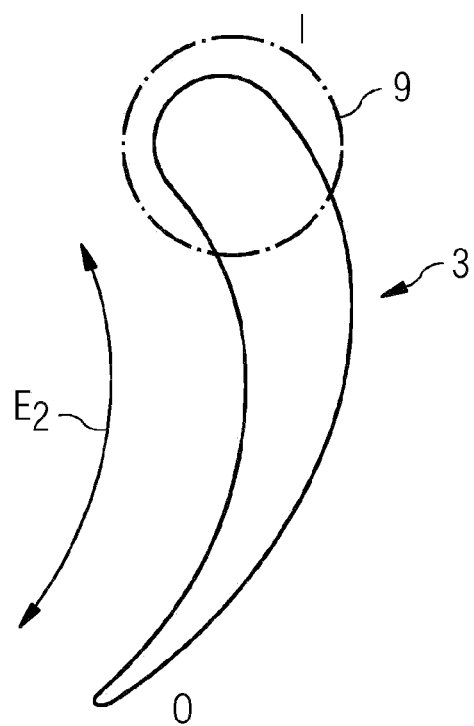

BLADE FOR A THERMAL TURBOMACHINE

CROSS REFERENCE TO RELATED APPLICATIONS

This application is the US National Stage of International Application No. PCT/EP2012/061210 filed Jun. 13, 2012, and claims the benefit thereof. The International Application claims the benefit of German Application No. DE 102011077804.7 filed Jun. 20, 2011. All of the applications are incorporated by reference herein in their entirety.

FIELD OF INVENTION

The present invention relates to a blade for a thermal turbomachine, having a blade airfoil with a first extent in a substantially radial orientation in relation to a rotational axis of the turbomachine and a second extent, which is formed transversely to the first extent, and having a blade root, which adjoins the blade airfoil and terminates the blade airfoil in the first extent. It furthermore relates to a method for producing a blade of this kind.

BACKGROUND OF INVENTION

Blades made of steel or titanium materials are currently used for those components of thermal turbomachines—e.g. gas turbines, steam turbines and compressors—which are subject to centrifugal forces. In contrast, fan blades of aircraft engines—which are also included among thermal turbomachines—are produced completely or partially from fiber composite materials.

Although, as metal materials, steel and titanium are of high strength, they are also subject to high centrifugal forces owing to their relatively high density. Thus, the achievable flow cross sections are limited, and this limits the power rating of the machines in particular.

However, the use of fiber composite materials, which are of course lighter and therefore subject to lower centrifugal forces, is not suitable in all areas of application. Thus, in the case of steam turbines for example, there is the risk of "droplet impact", i.e. the impingement of small water particles on the surface of the blade. Fiber composite materials would be destroyed within a short time by this action, and not only the fibers themselves but also the matrix structures connecting the fibers.

Another problem is that fiber composite materials are composed of aligned fiber plies laid one on top of the other. This means that each fiber ply is aligned substantially in a single direction of extent and therefore also ensures a particular stability particularly in relation to this selected direction of extent. If, on the other hand, fiber composite materials are supposed to ensure stability in several directions of extent, it is necessary to lay a plurality of fiber plies one on top of the other and to connect them, in which case the fiber plies must be aligned in different directions. In order to achieve a truly stable system, it is therefore often necessary to connect a large number of fiber plies to one another, and this may lead to excessive thicknesses.

It must therefore be stated that, on the one hand, metals (especially high-strength and corrosion-resistant metals such as steel or titanium) would be particularly suitable for constructing blades for turbomachines owing to their stability properties (resistance to centrifugal and torsional forces, tensile strength and yield strength and special hardness properties and resistance to the effects of foreign objects) and, on the other hand, fiber composite materials would be particularly advantageous for constructing blades for turbomachines because of their density properties. However, these two materials are virtually impossible to combine with one another in any useful way, for which reason there is the classic dilemma in the present case between two technical directions of approach which ultimately are almost mutually exclusive. Thus far, therefore, there is no fully satisfactory concept of how blades of thermal turbomachines can be produced that are, on the one hand, stable enough and, on the other hand, light enough.

SUMMARY OF INVENTION

It is therefore an object of the present invention to provide an improved solution for blades of thermal turbomachines. In particular, an aim here is to increase stability in comparison with fiber composite materials and to achieve a simultaneous reduction in density in comparison with metals such as steel and titanium.

Accordingly, a blade of the type stated at the outset is developed further in such a way that the blade comprises graphene at least in some region or regions, wherein graphene is taken to mean either pure graphene or graphene compounds, in particular also graphane. Graphene is a material on which there has been an increasing focus in the materials sciences in recent years. It denotes a modification of carbon of a substantially two-dimensional structure, in which each carbon atom is surrounded by three further atoms, giving a honeycomb pattern. Owing to the tetravalent nature of carbon, there must be three double bonds for each "honeycomb cell" here, but these are not localized. This is therefore a chain comparable to that of benzene rings of the kind known from aromatic chemistry.

In the context herein, the special physical properties of graphene are as follows: on the one hand, two-dimensional graphene monocrystals are extraordinarily rigid and strong within the plane thereof. At about 1020 GPa, the elastic modulus corresponds to that of normal graphite along the basal planes and is almost as great as that of diamond. Its tensile strength of $1.25 \times 10^{11}$ Pa is the highest ever determined and is around 125 times greater than that of steel. On the other hand, the density of graphene (monocrystalline graphene has a density of 2260 kg per cubic meter) is considerably less than that of steel (7850-7870 kg per cubic meter), namely about 3.5 times less. The use of graphene in constructing blades for thermal turbomachines therefore entails a significant increase in stability with a considerable reduction in weight at the same time.

Another advantage here is that graphene can be supplied in substantially two-dimensional structures, i.e. in the form of sheets, which can have a thickness down to atomic or molecular level. This also means that graphene products can be incorporated without problems in precisely the desired thickness during the production of blades of thermal turbomachines and can also be shaped in a simple and problem-free manner to the contours of the blade airfoil and/or blade root, which are generally not of a regular shape.

If a blade of a thermal turbomachine is constructed with graphene to replace fiber composite materials in the same region, there is furthermore a considerable improvement in thrust transmission, which is at least equal to that of metal.

The use of graphene is particularly suitable in the case of blades for thermal turbomachines in which the impingement of foreign objects is a possibility to be reckoned with during their operation. Foreign objects of this kind refer to non-gaseous bodies which may impinge upon the blade. In the case of a fan blade of an aircraft turbine, for example, foreign objects are therefore birds which enter the turbine during the starting or landing of the aircraft ("bird strike"). It is furthermore a particular concern herein to protect blades from foreign particles, i.e. foreign objects up to a size of water droplets. Whereas namely, in the case of bird strikes, forces act on the blade of a jet engine as a single event, the impingement of such foreign particles in steam turbines for instance is continuous and involves impact speeds of several 100 m/s and, in comparison, is of even greater significance for endurance. This applies especially because considerably higher operating forces occur during the operation of steam turbines than during the operation of jet engines. The invention is therefore particularly suitable for blades of steam turbines, i.e. for low-pressure blades.

In the text which follows, the term rotational axis of the turbomachine is also used to define the principal rotational axis. This principal rotational axis is determined by the inflow and outflow direction of the fluid which moves the turbomachine or is moved by the turbomachine. The two extents of the blade can be put in relation to the rotational axis insofar as the first extent proceeds at an angle, substantially perpendicularly, from the rotational axis, i.e. extends radially. The second extent too runs transversely to the rotational axis, likewise preferably substantially at right angles thereto, but at the same time at an angle to the first extent. In this case, the extents do not necessarily both have to be linear but can also have one or more bends. This applies, in particular, to the second extent since blades are often curved, twisted and/or undulating transversely to the first (radial) extent. It is possible (by averaging) to determine a linear principal direction of extent of the second extent to give a defined angle with respect to the first extent, in which case the second extent then runs in a curve along this linear principal direction of extent.

A method according to the invention of the type stated at the outset is distinguished by the fact that the blade is furnished with graphene at least in some region or regions.

An embodiment also relates to the use of graphene for producing a blade for a thermal turbomachine of the above-mentioned type. It is possible, though not necessary, here for graphene to be the principal or even the sole constituent of the blade. The amount of graphene in the blade will be essentially the outcome of a process of weighing up aspects of the design of the blade, the technical properties to be achieved (stability, load, weight and many other factors) and costs.

Finally, an embodiment relates to a thermal turbomachine having a rotational axis, from which a number of blades projects substantially radially. In this case, at least one of the blades is designed according to the invention.

Further particularly advantageous embodiments and developments of the invention will also be found in the dependent claims and in the following description. Here, the blade can also be developed further in accordance with the dependent claims relating to the method and vice versa.

According to a first development of the invention, the blade airfoil of the blade comprises graphene. Since the blade airfoil is a region of the blade which is subject to particularly high stresses during the operation of the turbomachine, the optimum stability properties of graphene can offer a special extra benefit particularly in this region. This is because both forces associated with flow and also bending and torsional stresses caused thereby as well as centrifugal forces which impose severe stresses on the blade airfoil in various directions occur in the region of the blade.

As an alternative or in addition thereto, provision is made, according to a second development of the invention, for the blade root to comprise graphene. This is because there are likewise high forces or stresses at the blade root since it is in the region of the blade root that the connection to the rotational axis, e.g. to a rotor disk or a rotor shaft, is made. Force transmission between the blade root and a rotational element, the center of which defines the rotational axis, therefore likewise entails locally high forces.

It is particularly preferred that both the blade root and the blade airfoil should comprise graphene, it being particularly preferred that there should be a connection between the blade root and the blade airfoil on the basis of continuous plies and/or layers and/or fibers. A continuous ply of this kind can also in turn comprise graphene, for example. By connecting the blade airfoil and the blade root by means of continuous elements, it is possible to create a reinforced overall join between the two, thereby enabling forces which arise in the blade root to be transmitted without problems to the blade airfoil and vice versa.

In principle, graphene can be localized anywhere within the blade, e.g. in an inner region, away from a surface region of the blade, in order to ensure a kind of core stability of the blade. It is preferred that the blade should comprise graphene in a surface region, as a particularly preferred option exclusively in the surface region. In respect of the surface region, it is understood here that the region is at least in the immediate vicinity of the surface of the blade, and preferably the surface region forms the outermost layer of the blade, i.e. the surface. However, it is also possible for an additional protective layer to be applied over the graphene in the surface region, and this can bring about additional technical and/or aesthetic effects. For example, a single- or multi-layer protective coating and/or finish can be applied to the surface, with the result that the protective coating or finish coating as a protective layer forms the actual surface, while the surface region at least includes the layer below the finish layer as well.

Localizing graphene in a surface region offers the advantage that it adequately shields the interior of the blade from impinging mechanical influences, e.g. those due to foreign objects, by virtue of its outstanding stability and, especially, hardness properties, and therefore the interior of the blade, i.e. the region which no longer counts as part of the surface region, can even be composed of relatively weak material. Stability is then preferably guaranteed predominantly by the graphene, at least in the regions which are underneath the surface region protected by the graphene when viewed from a principal direction of stress.

In the surface region, which contributes to a particular degree to the absorption and transmission of bending and torsional stresses and to rigidity, the graphene furthermore makes a major contribution to the strength of the blade.

Even if it is not localized directly in a surface region, the graphene can enclose a preshaped inner body. In the production of the blade, such an inner body serves, for example, as a support for further layers to be applied, e.g. a graphene layer of this kind, and can indirectly substantially determine the outer contour of the blade, provided that the further layers are of approximately the same thickness everywhere. An inner body of this kind, in turn, can also be made of graphene, and this is particularly preferred when very high levels of stability are required. However, the inner body can also be formed from other materials, e.g. less stable materials, such as fiber composite materials, metals, fabric structures, lightweight honeycomb lattices, foams (in particular high-strength foams) or the like. This is expedient for the sake of saving on costs and materials, especially where the blade cross sections obtained would not make full use of a blade constructed completely of graphene. Ultimately, the only decisive factor is that the combination of the inner body and the layers surrounding it and the arrangement of the required supporting cross sections to absorb forces and moments, in particular centrifugal, bending and torsional stresses, is such that the required strength of the blade is guaranteed.

To produce a blade with an inner body of this kind, a two-stage production method is preferred, in which the inner body is first of all formed, i.e. shaped and, if appropriate, solidified, and then outer plies, e.g. graphene outer plies, are applied to the inner body. Such outer plies can comprise substantially flat materials, such as fiber and/or graphene sheets, for example.

According to a first variant of the invention, provision is made for the graphene to be in the form of a homogeneous shaped body, at least in some region or regions. A homogeneous shaped body of this kind is obtained when the body is produced as a three-dimensional object with the aid of chemical and/or physical deposition or composite formation techniques, e.g. crystallization techniques. This is in contrast to the joining together of individual layers which, when layered one on top of the other as two-dimensional objects, can form a three-dimensional object in the form of a shaped body.

A second variant of the invention, which can be selected in addition or as an alternative to the first variant, provides for the graphene to be in the form of one or more plies of layer-type and/or sheet-type graphene structures, at least in some region or regions. Here, a layer-type graphene structure is defined as a substantially two-dimensional structure which has a very small number of superimposed carbon atoms, i.e. one which extends substantially in a plane and has an overall height in the nanometer range. In contrast, sheet-type graphene structures are known nowadays under the title of graphene paper and comprise deeper structures, which can be formed with the assistance, where appropriate, of bonding mechanisms apart from chemical bonds (i.e. electron bonds). The graphene paper can therefore be produced, for example, by adhesively bonding layer-type graphene structures or by some other suitable means of bonding.

Common to both graphene structures is the fact that the principal extent thereof is in one plane, and therefore the production of a three-dimensional structure in the range of thicknesses that can be detected visually can be achieved only by placing several such layers or sheets one on top of the other. The advantage of using such layer-type or sheet-type graphene structures within the context of the invention is manifold:

Firstly, it is thereby possible to ensure that the valuable material, graphene, is used very sparingly and that it is only precisely the layer thicknesses required to produce a certain desired stability which are obtained.

Secondly, a medium of such two-dimensional configuration is also simpler to make up, especially in consideration of the outstanding hardness properties of the graphene.

Thirdly, different depths, i.e. thicknesses, of the graphene in the region of the blade can be achieved by locally superimposing a different number of layers of the graphene structure.

Fourthly, the production of such substantially two-dimensional graphene structures is currently considerably simpler than the production of three-dimensional shaped bodies as mentioned above.

Fifthly, layer-type or sheet-type graphene structures can be converted to a three-dimensional but essentially flat shape simply by bending or by permanent deformation. In this way, they can be shaped to other components without problems. It is thereby possible to use graphene to produce surface reinforcements, in particular, in a simple and low-cost manner.

A special effect is furthermore obtained if the graphene structures are connected to one another at least in some region or regions by impregnation and/or fusion and/or adhesive bonding. Such impregnation and fusion methods include, in particular, the methods which are currently used in the production of fiber composite materials, assisted, for example, by a vacuum and/or by excess pressure from outside, that is to say injection methods or similar. In this case, therefore, a resin, in particular a synthetic resin, is injected or introduced in some other way between the individual plies of the graphene structures. In the course of a liquefaction, and if appropriate mixing and reaction and subsequent cross-linking process, the bond becomes so strong that the individual graphene plies (that is to say graphene layers or sheets) are firmly joined together.

The use of such a method also means that it is possible, with the aid thereof, to combine and fuse graphene plies with fiber composite materials in a relatively simple manner. A mixed composite may thus also be obtained therefrom. On the one hand, a very low overall weight is obtained here by virtue of the low density of graphene and of the fibers. On the other hand, a significantly higher stability in comparison with simple fiber composite materials is achieved through the use of graphene. In this specific embodiment, the invention thus made use of the fact that known connection techniques of the kind already used in the aircraft industry can be employed particularly profitably in conjunction with the novel material graphene and that a particularly advantageous combination of different materials, namely the known fiber composite materials and graphene, can even be achieved.

In the context of this specific embodiment, the method according to the invention is developed further by supplying the graphene in the form of one or more plies of layer-type and/or sheet-type graphene structures, which are connected to one another at least in some region or regions by impregnation and/or adhesive bonding. In this case, it is possible, in particular, for the graphene to be supplied embedded in a resin matrix, which is at least partially liquefied and fused to adjacent plies in an impregnation and/or fusion process. In other words, the graphene can be supplied here as a pre-coated semifinished product in the form of "prepregs", which is then subsequently connected to other regions of the blade in an autoclaving process or a similar fusion method with the application of heat and/or pressure.

As already mentioned, a distinction can be drawn in the use of graphene layers or sheets between blade regions subjected to higher or lower stress. This is implemented, in particular, by there being more layers of graphene structures in a first subregion than in a second subregion. This gives rise to locally differentiated variations in the thickness of the graphene region. Thus, in those regions in which particularly high stress due to foreign objects is to be expected, for example, a stronger graphene region can be arranged than in other regions. Another possibility is selective arrangement of graphene exclusively or predominantly in those regions in which the high stability of the material is necessary, while other regions can also be completely free of graphene or can be provided with a reduced amount of graphene.

The use of sheet-type or layer-type graphene structures furthermore has the advantage that said structures can be aligned differently in order to counteract or withstand forces in an optimal manner in each case. Thus, according to one variant, it is preferred that at least some of the graphene structures are aligned substantially parallel to one another along a profile surface or profile plane. As a particularly preferred option, this applies to all the graphene structures, thus giving a completely parallel alignment of the graphene structures relative to one another. It should be noted here that the profile surface does not necessarily have to be defined by two straight lines but can also be a curved, twisted and/or undulating surface. This is the case, for example, particularly when the surface is defined by the profile shape of the blade airfoil since the graphene can then be oriented along such a profile, for example.

As a particularly preferred option, the profile surface is defined by at least one extent, preferably by both extents, of the blade. This means that the profile surface corresponds at least in some region or regions to said extents, i.e. that is to say, for example, runs substantially parallel thereto or, according to a specified definition, runs transversely to said extents. This can advantageously always be at the same angle to the respective extent, particularly preferably perpendicularly to said extent. If it is assumed that the directions of extent simultaneously specify which directional forces run within the blade airfoil or blade, an optimum force transmission and/or damping effect can in each case be achieved by aligning the graphene structures with regard to said directions of extent. The stability of the blade is optimized through the optimized alignment of the graphene structures.

In the case where the blade comprises an inner shaped body, it may be expedient (as envisaged according to a second variant) for the graphene structures to be arranged in a U-shape around a shaped body, substantially parallel to one another, or in such a way that they follow the outer contour of the shaped body. A U-shape is a rounded profile shape with a change in profile direction by at least 90°, preferably at least 120° and particularly preferably 180° or more. Such a profile is based on at least one section plane of the blade, particularly preferably a section plane which is parallel to the rotational axis of the turbomachine. Thus, a sheet-type or layer-type graphene structure is laid around the shaped body, hugging the shape of said shaped body and therefore reflecting the shape thereof (when expanded). This results in armoring of the shaped body wherever the sheet-type or layer-type graphene structure is applied to the shaped body, similar to a closely fitting armor plate of a suit of armor.

Such armoring of a shaped body is advantageous especially when it may be expected that foreign objects, especially very small objects such as foreign particles (droplets or the like) will impinge upon the blade airfoil from a particular direction. By virtue of the rounded shape of the outer contour of the airfoil, along the surface region of which the graphene structures are applied, it is not possible for such foreign objects to penetrate into the interior of the blade airfoil. The interior of the blade is thus prevented effectively from local damage and from aging due to wear. Such an arrangement thus almost automatically lengthens the life of the blade airfoil since abrasion effects are avoided and sudden bursting of the blade airfoil, for example, is made virtually impossible.

It is also possible to combine the above-described two variants of the alignment of the graphene structures, in such a way, for example, that graphene structures in the interior of the blade are aligned in accordance with the first variant, and graphene structures are laid around the inner shaped body formed in this way in accordance with the second variant.

Special attention is paid in the context of the invention to reducing the effect of foreign objects on the blade as far as possible. It is therefore preferred that the graphene should be localized and/or aligned and/or increased in thickness in accordance with a direction of stress on the blade due to impinging particles during the operation of the turbomachine. Thus, the graphene is applied precisely where foreign objects and/or material flows first impinge on the blade airfoil, i.e. in accordance with erosive attacks or stresses. Accordingly, the graphene is aligned in such a way as to ensure that, in the direction of maximum stress on the blade due to material flows, there are as far as possible no structures into which said material flows can penetrate. It is likewise possible in addition to increase the thickness of the graphene in these regions of erosive attacks in order to be able to prevent abrasion and aging phenomena as effectively as possible. Foreign objects include especially those mentioned above, namely bird strikes, sand particles, droplets or the like. Of course, material flows also include especially process gas flows which arise during the normal operation of the turbomachine: this is the reaction gas in the case of a gasturbine, the steam in the case of a steam turbine and the ambient air in the case of an aircraft turbine.

In order, in particular, to preempt the effect of foreign objects, the blade preferably comprises a protective layer on an outer envelope of the blade airfoil. Such a protective layer can comprise very different shapes and materials, depending on the type of foreign objects to be expected. For example, it can be designed in such a way that relatively large objects, such as birds, do not cause any major damage when they strike the blade airfoil. It can also be designed in such a way that relatively small particles, in particular droplets, are compensated for in an effective manner during the operation of a steam turbine. The protective layer is thus a kind of single- or multi-ply additional layer on the blade which fulfills a protective purpose specifically tailored to the intended use of the turbomachine alongside the other components of the blade.

According to a first variant, the protective layer can be implemented as a foil and/or film-type covering. Thus, it is, for example, a coating in the form of a finish coat and/or a foil or film, e.g. a metal foil or a plastic film, which forms the outer envelope of the blade airfoil, at least in some region or regions. The protective layer can once again also comprise graphene and, in that case, can preferably then be formed completely of graphene.

The protective layer can furthermore be embodied as a single- or multi-ply protective coating formed from suitable materials, e.g. plastics, metals and/or nonmetallic materials.

Another possibility for the formation of a protective layer is for said layer to comprise a shaped body, i.e. a type of protective strip, which is connected to other regions of the blade by connection techniques. More specifically, such connection techniques comprise adhesive bonding, soldering and welding but also impregnation, clamping on or in, screw fastening and nailing or the production of a bolted joint, and this list should not be regarded as exhaustive. The respective connection technique is used to ensure that the shaped body is connected as firmly as possible to the other regions of the blade and, as a result, is not detached from the other regions of the blade when foreign objects are encountered. This connection technique furthermore serves to enable forces acting on the shaped body to be transmitted in an effective manner by the other regions of the blade. Thus, forces are transmitted by virtue of nonpositive and/or positive engagement. A protective layer of this kind in the form of a shaped body is preferred especially when relatively large foreign objects, that is to say those which are at least of droplet size or considerably larger, are to be expected. The shaped body can be constructed from graphene but also from a metal or from other nonmetallic materials.

As already mentioned, it is particularly advantageous if the blade root and the blade airfoil are particularly well connected to one another, thus resulting in a stable overall structure. In this context, it is preferred that the blade root and the blade airfoil should have superimposed and interconnected layer plies, at least in a transitional region, said plies extending at least partially over the transitional region. Such layer plies do not necessarily have to be graphene plies in the form of sheet-type or layer-type graphene structures, but this is preferred. It is also possible, for example, to use fiber plies as layer plies, including, for instance, interconnected multi-layer fiber plies. Overall, a higher stability of the blade per se as a whole is produced by the continuous extent of the layer plies beyond the transitional region, and, when layer plies comprising graphene (in whole or in part) are used, this stability is naturally increased in a particularly effective manner as described above.

As regards the blade root of the blade according to the invention, it is preferred that it form contact surfaces with respect to a rotor or a casing of the thermal turbomachine. This can be achieved by means of appropriate shaping, for example, in particular shaping of graphene plies in the root, which have very good contact properties owing to their high strength and hardness. In addition, it is also possible to introduce further materials into the root, e.g. metal to provide a compatible contact and ensure manufacturing tolerances and/or deformable materials or materials deformed during installation for tolerance compensation—e.g. rubber or thermoplastics.

For attachment to a rotational axis or rotational element, that is to say, for example, a rotor disk or rotor shaft, the blade root preferably comprises holes and/or recesses in the outer contour thereof and, in the region of the holes and/or the recesses, has at least one material reinforcement, which is designed as a contact reinforcement and/or as a friction surface for local connections to the rotational axis. Such material reinforcements can be made of metal for example, e.g. as metal facings, and/or of plastic (facings), but also once again as graphene reinforcements. With the aid of these material reinforcements, it is possible to keep the contact between the rotational axis and the blade stable and/or to prevent frictional wear or damage due to friction. The holes or recesses can be implemented in the way that they are currently implemented on "plug-in" roots or on firtree roots of blades, for example.

To produce the blade according to the invention, it has proven particularly effective to assemble the blade, in particular the blade airfoil, from a number of preshaped individual parts, with at least one of the individual parts comprising graphene and/or being furnished with graphene. Thus, for example, a distinction may be made between an inlet or inflow side and an outlet or outflow side of the blade airfoil. The outlet side is the region which faces away from the material flow, while the inlet side is the one which lies in the material flow. In the nature of the case, the inlet side region is subjected to more severe stress by erosive attacks as a result. This also means that, in the specific case, the inlet side region is preferentially furnished with graphene. However, it may also be beneficial (in a specific case additionally) to form the outlet side region completely or partially with graphene, e.g. for protection against material flows in the case of reverse flows or light-load states. This depends substantially on the type of turbomachine, the configuration of the blade, in particular the geometrical configuration of the blade, the operating temperatures, the type of material flow, the pressure conditions in the turbomachine and many other factors.

Of course, other subdivisions of a blade are also possible, e.g. the division between the blade airfoil and the blade root, subdivision between an inner shaped body and an outer envelope of the blade and many others, and it is also possible for more than just two individual parts to be joined together. Thus, for example, the blade airfoil can be of separate construction and be combined at a later stage with the blade root, it also being possible for both the blade airfoil and the blade root to comprise several individual parts each joined together first before the two elements—the blade root and the blade airfoil—are combined.

BRIEF DESCRIPTION OF THE DRAWINGS

The invention is explained in greater detail once again below by means of illustrative embodiments with reference to the attached figures. In the various figures, components that are the same are provided with identical reference numerals. In the drawing:

FIG. 1 shows a perspective view of a first configuration of a blade according to the invention, FIG. 2 shows a sectional view along a section line II-II in FIG. 1.

DETAILED DESCRIPTION OF INVENTION

Figure 3:
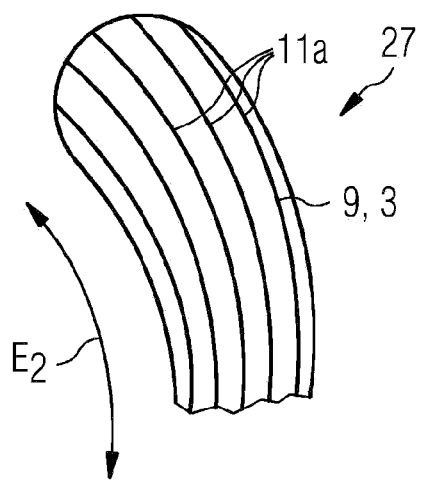
FIG. 3 shows a detail of the sectional view in FIG. 2 to illustrate a first preferred embodiment of the invention.

FIGS. 1 and 2 show a blade 1 on a thermal turbomachine 7, which is mounted so as to be rotatable about a principal rotational axis A of the turbomachine 7. It has a blade airfoil 3 and a blade root 5. The blade root 5 is securely connected to a rotational element which defines the rotational axis A. The type of connection and the type of rotational element are not shown specifically. It is possible, for example, to connect the blade root 5 to a rotary disk, while other rotational elements can be designed as rotor shafts, for example. A rotor disk can also be designed in such a way that it is arranged and mounted rotatably within a round casing and defines a circle within which the blades are arranged. In this case, the rotational axis A is not manifested physically but is defined by the geometrical arrangement of the rotor disk and of the blades. In other words, the rotor disk then rotates about the rotational axis A without itself being arranged on the rotational axis A.

The blade airfoil 3 projects substantially perpendicularly from the principal rotational axis A in a first extent $E_1$. In a cross section thereof (cf. FIG. 2), it has a rounded front region 9, which corresponds to the inflow side I during the operation of the turbomachine. From the front side 9 in the direction of the outflow side O facing away from the inflow side I, i.e. in a second extent $E_2$, the blade airfoil 3 is arcuate and tapers gradually to a point. The rounded front region 9 is the region of the blade airfoil 3 in which a material flow, i.e. the fluid, which is passed through the thermal turbomachine 7 first impinges. This means that an erosive attack by the fluid or by foreign objects entrained by the fluid takes place in this region. In addition to relatively large objects, which occur relatively seldom, these foreign objects are primarily foreign particles, e.g. droplets when a steam turbine is being operated as the turbomachine 7. Relatively large objects occur primarily in free air operation of turbomachines, one example being the abovementioned bird strike in the case of jet engines. Depending on the application and operating state, the erosive attack can come from different directions, e.g. at an angle to the edge of the inflow side I or at an angle to the edge of the outflow side O.

It is thus possible in the front region 9 that foreign objects that represent a particular challenge to the stability of the blade 1 will impinge. It can furthermore be seen in FIG. 1 that the blade airfoil 3 has a shape twisted upon itself along the first extent $E_1$, with the result that the front region 9 faces rearward to the left at the level of section II-II in FIG. 1 and is then twisted upward counterclockwise and faces rearward to the right in the upper airfoil region. The end of the blade airfoil 3 which is to be associated with the outflow side O is oriented forward to the left in the lower airfoil region and more or less retains this alignment, apart from a certain change in angle. As a result, the basic outline is not the same as that in FIG. 2 in all section planes parallel to section II-II. On the contrary, a different curvature and alignment of the blade airfoil than that shown in FIG. 2 will be found in an upper region of the blade airfoil 3 in FIG. 1 in the case of a parallel section.

In general, the blade 1 is designed in such a way that it comprises graphene. This considerably increases the stability of the blade 1, in particular its stability in respect of centrifugal forces, bending and torsion, especially that of the blade airfoil 3, since the graphene can compensate very effectively for forces in the direction of both extents $E_1$, $E_2$ owing to its two-dimensionally very stable properties (i.e. it is very stable in two principal directions). However, the blade root 5 may contain graphene. Graphene is furthermore preferably also contained in a transitional region 23 between the blade airfoil 3 and the blade root 5, thus ensuring that the blade root 5 and the blade airfoil 3 are connected to one another in a particularly secure and stable manner. In addition to stabilizing the blade 1, the graphene also serves to allow a reduction in the weight of the blade 1 in comparison with blades formed exclusively of metal. This results from the significantly lower density of graphene in comparison with metals or metal alloys.

FIG. 3 shows the front region 9 according to a first embodiment of the invention. Here, the graphene is incorporated into the blade airfoil 3 in the form of a sheet-type graphene structure 11a which follows the airfoil contour of the blade airfoil 3. In this case, it is aligned with the second extent $E_2$. This means in this case that it is aligned substantially parallel to the second extent $E_2$ and also parallel to the first extent $E_1$ (not visible in the figure under consideration). The individual graphene structures 11a are therefore substantially parallel to one another and a firm bond is created between them with the aid of an impregnation method. The surface region 27 of the front region 9 also comprises graphene.

Figure 4:
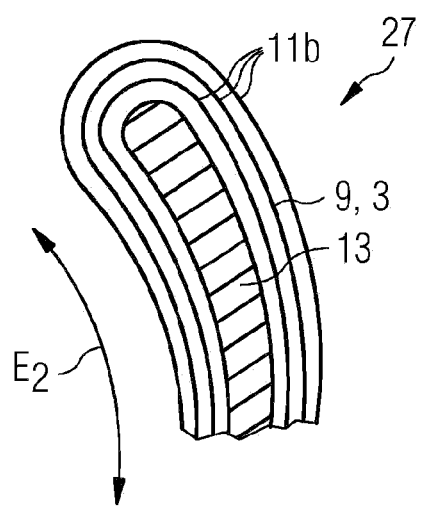
FIG. 4 shows a detail of the sectional view in FIG. 2 to illustrate a second preferred embodiment of the invention.

FIG. 4 shows the front region 9 in the context of a second embodiment of the invention, which can be chosen as an alternative to the first embodiment. Here, the blade airfoil 3 is furnished in the front region 9 with an inner shaped body 13, which is here designed as a metal core. The inner shaped body 13 is thus a kind of spacer or spacing element from the interior of the blade 1 to the surface region 27. In addition to metal, it can also comprise a fabric and/or a lightweight honeycomb lattice and/or a foam, in particular a high-strength foam, for example. Combinations of these or of other materials are also possible, depending on the area of application of the blade 1. In particular, the inner shaped body 13 can also comprise graphene. A number of plies of a graphene structure 11b arranged in a U shape around the outline of the inner shaped body 13 are once again built up around the inner shaped body 13, thus comprising the surface region 27. In other words: here, the surface region 27 is defined completely by graphene structures 11b, which are laid, i.e. arranged, around the airfoil contour of the blade airfoil 3.

Figure 5:
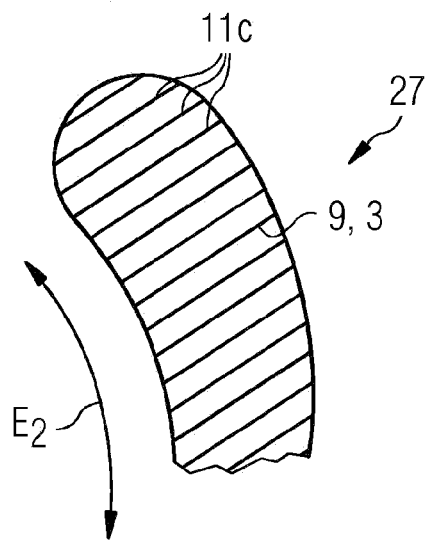
FIG. 5 shows a detail of the sectional view in FIG. 2 to illustrate a third preferred embodiment of the invention.

FIG. 5 shows the front region 9 in the context of a third embodiment of the invention. This embodiment too can be understood as an alternative to the two preceding embodiments. Here too, in a manner similar to that shown in FIG. 3, the front region 9 comprises sheet-type graphene structures 11c, although, in the present case, they are aligned substantially perpendicular to the second extent $E_2$, i.e. transversely to the airfoil contour of the blade airfoil 3. It is thereby possible to avoid particles impinging on the blade airfoil 3 along the second extent $E_2$ from being able to penetrate into the interior of the blade airfoil 3, in contrast to the first illustrative embodiment in accordance with FIG. 3. For this purpose, the graphene structures 11c form a surface by virtue of their alignment transverse to the erosive attack. In contrast, particles in the first embodiment in accordance with FIG. 3 would impinge on the blade airfoil 3 precisely where the joints of the individual sheet-type graphene structures 11a are located, and, as a result, would be able to penetrate more easily into the interior of the blade 1.

Figure 6:
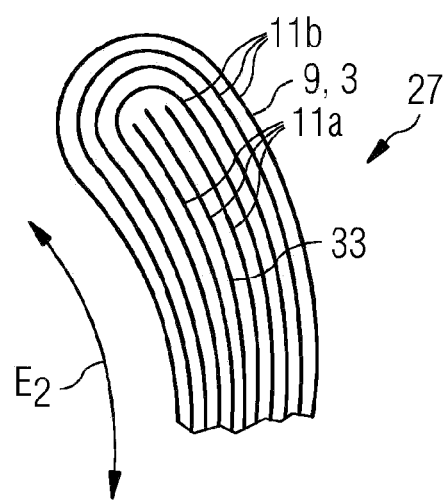
FIG. 6 shows a detail of the sectional view in FIG. 2 to illustrate a fourth preferred embodiment of the invention.

FIG. 6 shows a fourth embodiment of the invention, which could be referred to as a kind of combination of the first and second embodiment in accordance with FIGS. 3 and 4. Here, on the one hand, an inner shaped body 33 is formed, being reminiscent in shape of the inner shaped body 13 in FIG. 4. However, this inner shaped body 33 is formed from sheet-type graphene structures 11a aligned similarly to those in FIG. 3. To prevent particles from impinging precisely on the joint between the sheet-type graphene structures 11a and possibly splitting them apart, a U-shaped graphene structure 11b is built up around the inner shaped body 33 in the present embodiment too—as shown in FIG. 4. Once again, the surface region 27 is thus formed from graphite.

Figure 7:
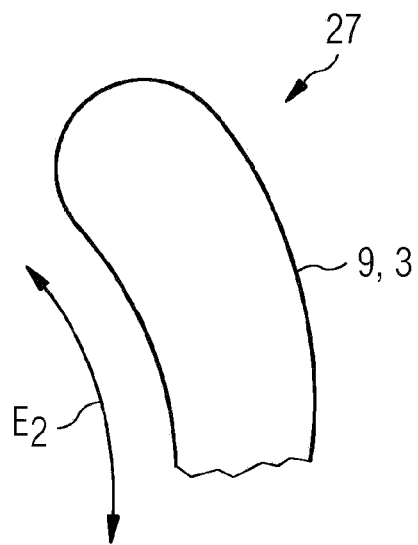
FIG. 7 shows a detail of the sectional view in FIG. 2 to illustrate a fifth preferred embodiment of the invention.

FIG. 7 shows a fifth embodiment of the invention, once again in respect of the front region 9 of the blade airfoil 3. Here, the entire blade airfoil 3 is integral and constructed uniformly from graphene. In contrast to a multi-layer or multi-ply structure comprising individual sheet or layer structures joined together, as shown in the previous illustrative embodiment, the shaped body presented here is thus a three-dimensional shaped body formed completely of graphene. It must also be mentioned in the context of the embodiment presented here that such a shaped body made of graphene can also comprise a plurality of interconnected shaped bodies, not all of which have to comprise graphene. For example, an inner shaped body 13 of the kind shown in FIG. 4 can once again be arranged in the interior of the blade.

Figure 8:
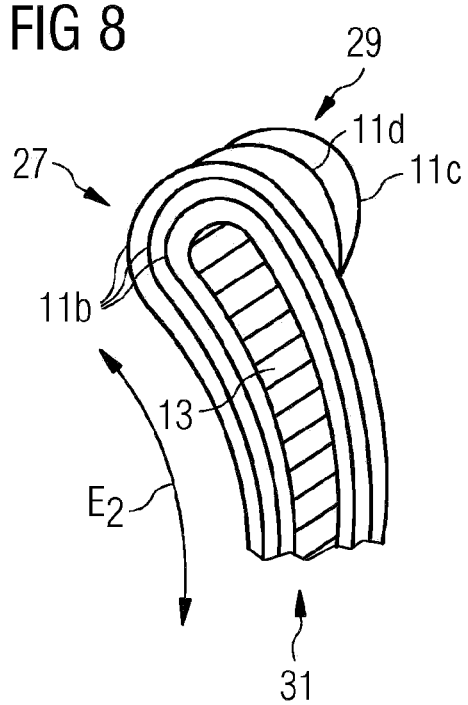
FIG. 8 shows a detail of the sectional view in FIG. 2 to illustrate a sixth preferred embodiment of the invention.

FIG. 8 shows a sixth embodiment of a blade airfoil 3 according to the invention or the front region 9 thereof. Here too, similarly to the embodiment shown in FIG. 4, a plurality of sheet-type graphene structures 11*b* are built up in a kind of U shape around an inner shaped body 13. In a first subregion 29, additional sheet-type graphene structures 11*d*, 11*e* are added, with the result that there is a total of five sheet-type graphene structures 11*b* (3×), 11*d*, 11*e* in this first subregion 29 in comparison with a second subregion 31, in which there are only three sheet-type graphene structures 11*b*. This means that there is a reinforcement of the graphene plies in the first subregion 29, in which an erosive attack is expected, thus once again enabling increased protection from impinging foreign objects to be achieved.

Figure 9:
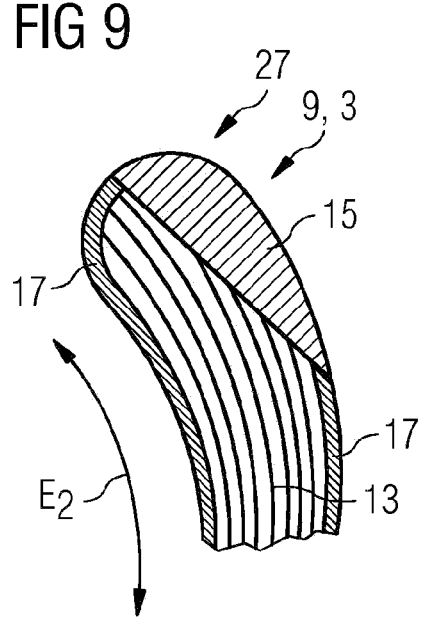
FIG. 9 shows a detail of the sectional view in FIG. 2 to illustrate a seventh preferred embodiment of the invention.

A similar aim is pursued by the seventh embodiment too, this embodiment being explained in greater detail with reference to FIG. 9. Here, an inner shaped body 13 is presented in the form of a graphene body 13, which is provided with protective layers 15, 17 on the surface region 27 of the blade 1. A first protective layer 17 is a plastic covering; however, a metal foil or a graphene layer could also be provided. It is furthermore possible to provide a multi-layer protection system constructed from a plurality of plies. The protective layer 15 arranged further up in the region of an erosive attack is a protective strip 15, i.e. a shaped body 15, in this case made of titanium. However, some other choice of material, graphene again or stellite for example, is also possible.

Figure 10:
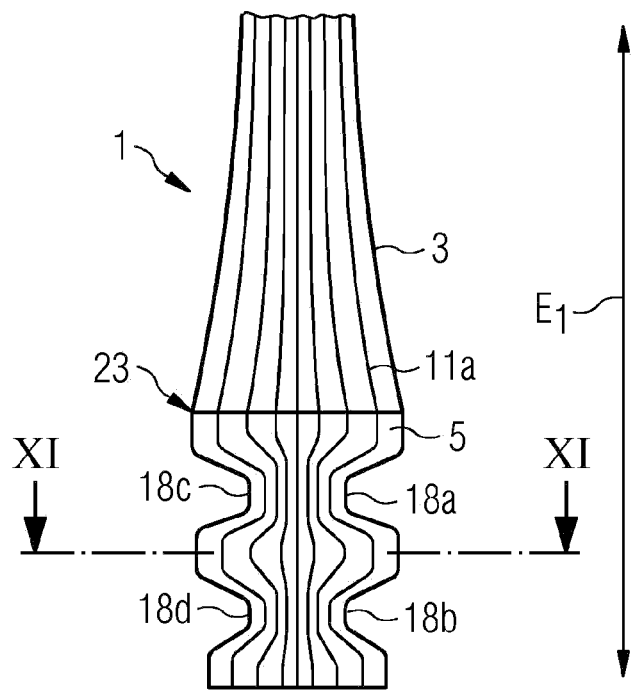
FIG. 10 shows a front view of a second configuration of a blade according to the invention.
Figure 11:
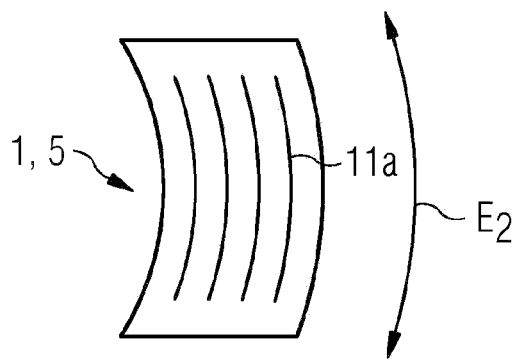
FIG. 11 shows a sectional view along a section line XI-XI in FIG. 10.

FIG. 10 shows a configuration of a blade 1 according to the invention which corresponds substantially in shape to the shape of the blade shown in FIG. 1 and, in particular, like the latter, has a "firtree root" 5, which is connected to a blade airfoil 3 by a transitional region 23. Once again, the blade 1 is part of a thermal turbomachine 7. Oriented substantially along a first extent $E_1$ there is a plurality of interconnected sheet-type graphene structures 11*a*, which extend from the blade root 5 into the blade airfoil 3 and are connected to one another with the aid of a resin impregnation method. FIG. 11 shows a cross section of the root along a section line XI-XI, in which it can be seen that the graphene structures 11*a* are also aligned along the second extent $E_2$ of the blade 1. In other words, the surface defined by the two extents $E_1$ and $E_2$ serves as an alignment for the individual sheet-type graphene structures 11*a*, along which said structures are arranged substantially parallel.

Figure 12:
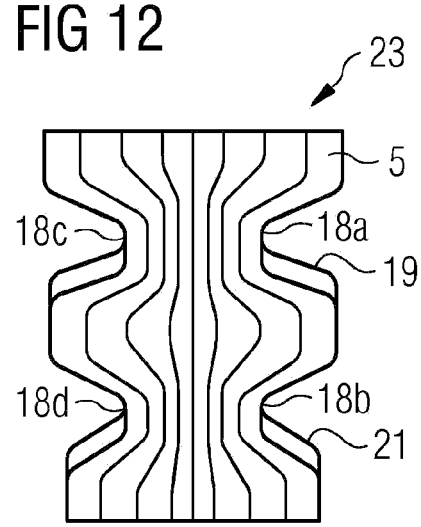
FIG. 12 shows a detail of the blade root of the blade in FIG. 10.

FIG. 12 shows a detail of the blade root 5 from the previous two figures. In the manner of a fir-tree root, it has two recesses 18*a*, 18*b*, 18*c*, 18*d* on each side. A metal facing 19 is formed in the recess 18*a* at the top right in FIG. 12, namely on the upper side of a nose-type protrusion which forms the bottom end of the top recess 18*a*. A thermoplastic facing 21 is formed in a manner similar to this in the case of the bottom right-hand recess 18*b*, in a similar upper region of a second nose-type protrusion. Whereas the metal facing 19 serves essentially to stabilize the connection with the rotational axis (not shown), the thermoplastic facing 21 is a friction facing for the link to this rotational axis. A metal facing and a thermoplastic facing can be formed in a similar manner in the top left recess 18*c* and the bottom left recess 18*d*.

Figure 13:
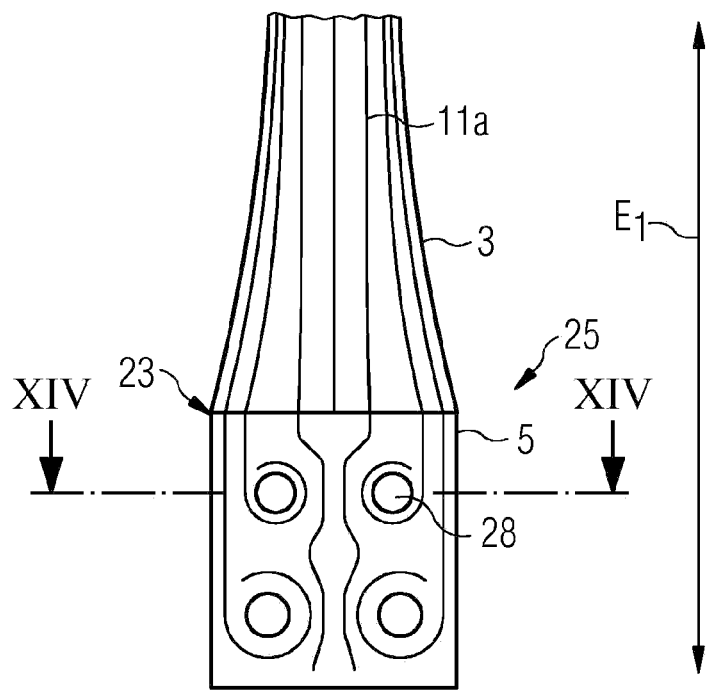
FIG. 13 shows a front view of a third configuration of a blade according to the invention.
Figure 14:
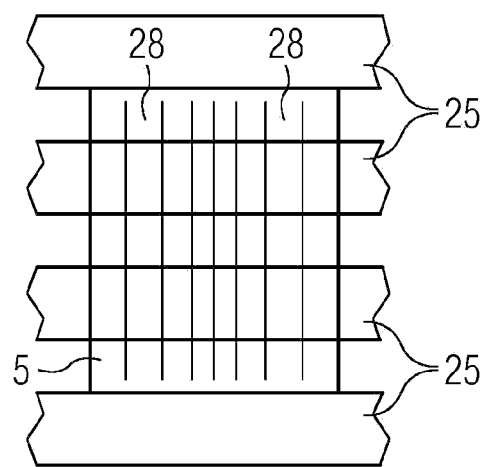
FIG. 14 shows a sectional view along a section line XIV-XIV in FIG. 13.

FIGS. 13 and 14 show another configuration of a blade 1 according to the invention, in which the blade root 5 is embodied as a plug-in root 5. Also shown is a rotor disk 25, the profile of which can be seen especially in the sectional view in FIG. 14. A blade root 5 of a blade 1 according to the invention is introduced in each case between two subregions of the rotor disk 25. The connection between the respective blade roots 5 and the rotor disk 25 is made by means of bolts, which are passed through in holes 28 introduced both into the respective blade root 5 and into the rotor disk 25. The positions of said holes correspond to one another in such a way that they can be made to coincide with one another in a correct assembly state. Here too, similarly to the illustrations in FIG. 10 to FIG. 12, sheet-type graphene structures 11*a* are connected to one another and aligned.

In conclusion, attention is once again drawn to the fact that the components of the blade or of the thermal turbomachine described in detail above are merely illustrative embodiments which can be modified in many different ways by a person skilled in the art without exceeding the scope of the invention. Moreover, the use of the indefinite article "a" or "an" does not exclude the possibility that there may be more than one of the features concerned. In addition, "units" can comprise one or more components, including components arranged in a spatially distributed manner.

The invention claimed is:

1. A blade for a thermal turbomachine, comprising
  a blade airfoil with a first extent in a substantially radial orientation in relation to a rotational axis of the turbomachine and a second extent, which is formed transversely to the first extent, and comprising a blade root, which adjoins the blade airfoil and terminates the blade airfoil in the first extent, wherein the blade comprises graphene at least in some region or regions;
  wherein the blade root and the blade airfoil have superimposed and interconnected layer plies, at least in a transitional region, said plies extending at least partially over the transitional region.

2. The blade as claimed in claim 1, comprising graphene in a surface region.

3. The blade as claimed in claim 1, wherein the graphene encloses a preshaped inner body.

4. The blade as claimed in claim 1, wherein the graphene is in the form of a homogeneous shaped body, at least in some region or regions.

5. The blade as claimed in claim 1, wherein the graphene is in the form of one or more plies of layer-type and/or sheet-type graphene structures, at least in some region or regions.

6. The blade as claimed in claim 5, wherein the graphene structures are connected to one another at least in some region or regions by impregnation and/or fusion and/or adhesive bonding.

7. The blade as claimed in claim 5, wherein at least some of the graphene structures are aligned substantially parallel to one another along a profile surface.

8. The blade as claimed in claim 5, wherein the graphene structures are arranged substantially parallel to one another around a shaped body in such a way that they follow the outer contour of the shaped body.

9. The blade as claimed in claim 1, wherein the graphene is localized and/or aligned and/or increased in thickness in accordance with a direction of stress on the blade due to impinging particles during the operation of the turbomachine.

10. The blade as claimed in claim 1, comprising a protective layer on an outer envelope of the blade airfoil.

11. The blade as claimed in claim 10, wherein the protective layer comprises a shaped body, which is connected to other regions of the blade by connection techniques.

12. A thermal turbomachine having a rotational axis, from which a number of blades projects substantially radially, wherein at least one of the blades is designed as claimed in claim 1.

13. A method for producing a blade for a thermal turbomachine, comprising providing a blade airfoil with a first extent in a substantially radial orientation in relation to a rotational axis of the turbomachine and a second extent, which is formed transversely to the first extent, and a blade root, which adjoins the blade airfoil and terminates the blade airfoil in the first extent, furnishing the blade with graphene at least in some region or regions; and wherein the blade root and the blade airfoil have superimposed and interconnected layer plies, at least in a transitional region, said plies extending at least partially over the transitional region.

14. The method as claimed in claim 13, wherein the blade is composed of a number of preshaped individual parts, wherein at least one of the individual parts comprises graphene and/or is furnished with graphene.

15. The blade as claimed in claim 1, comprising graphene exclusively in the surface region.

* * * * *